Jan. 10, 1950        H. ABRONS        2,494,223
LAWN EDGE CUTTER
Filed Feb. 27, 1947
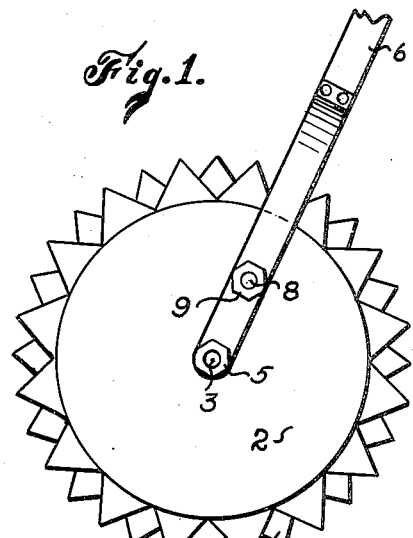
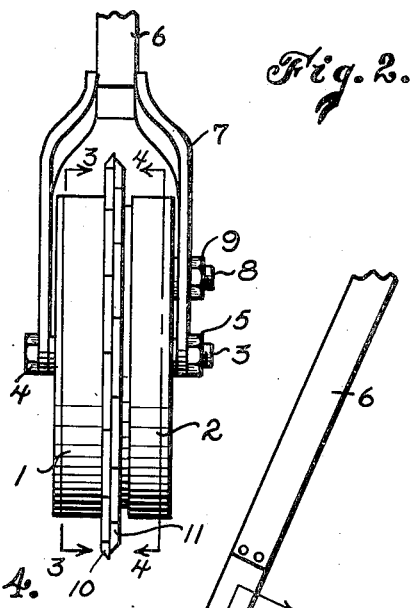
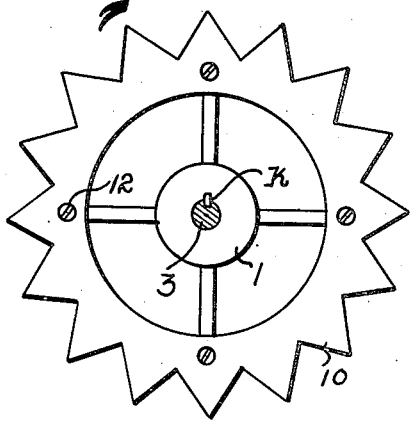
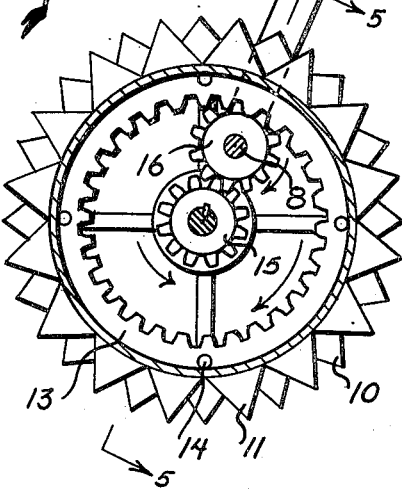
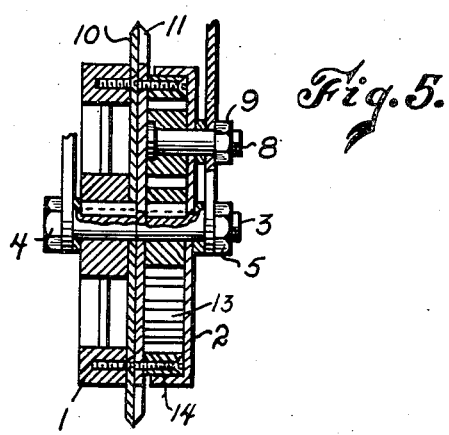
INVENTOR.
Hyman Abrons
BY *Victor J. Evans & Co.*
ATTORNEYS

Patented Jan. 10, 1950

2,494,223

UNITED STATES PATENT OFFICE 2,494,223

LAWN EDGE CUTTER

Hyman Abrons, Hollywood, Calif.

Application February 27, 1947, Serial No. 731,338

1 Claim. (Cl. 56—256)

My present invention relates generally to rotary cutting implements, and more specifically to an improved lawn edge cutter or cutter of the type employing a pair of oppositely revolving shearing or cutting disks revolving in a vertical plane, propelled by push of hand, and in which the cutters are traction-operated.

The primary object of the invention is the provision of a tool of this character that is composed of a minimum number of component parts which may with facility be manufactured and assembled with convenience to provide an implement that is comparatively light and easily operated, and which is speedy and accurate in the performance of its functions of cutting and trimming the edge of a lawn.

The invention consists in certain novel features of construction and combinations and arrangements of parts as will hereinafter be described, and more specifically set forth in the appended claim.

In the accompanying drawings I have illustrated a complete physical embodiment of my invention in which the parts are combined and arranged in accord with one mode I have so far devised for the practical application of the principles of my invention. It will be understood however that changes and alterations are contemplated and may be made in these exemplifying drawings and mechanical structures, within the scope of my claim, without departing from the principles of my invention.

Figure 1 is a view in side elevation of a lawn trimmer in which the principles of my invention are embodied; and Figure 2 is a front view of the implement.

Figure 3 is a detail view at line 3—3 of Fig. 2.

Figure 4 is a sectional detail view at line 4—4 of Fig. 2; and

Figure 5 is a transverse sectional view at line 5—5 of Fig. 4.

In carrying out my invention I employ a spoked traction wheel or power wheel 1, and a laterally spaced complementary cylindrical non-rotary housing or cover 2, through which is extended a central spindle 3 having a retaining head 4 at one end and a lock nut 5 at the opposite end of the spindle.

The wheel is keyed on the spindle at K and it revolves counterclockwise with the spindle as the wheel rolls over the surface of the ground as the implement is hand propelled. A handle 6 is provided with a bearing yoke 7 for the spindle, and the housing or non-rotary cover 2 is rigidly attached to the yoke by means of bolt 8 and the lock nut 9.

Between the rotary power wheel 1 and the non-rotary housing 2, a pair of oppositely revolving or rotating circular cutters or toothed disks are mounted, each of which consists of a circular disk, as 10 and 11, having toothed peripheries that project beyond the peripheries of the power wheel and the non-rotary housing. The toothed peripheries of the cutters are held in close frictional contact, and as they revolve in opposite directions a shearing motion and action is attained for trimming the lawn as the wheel 1 rolls over the ground surface.

The rotary cutter 10 is keyed to the spindle, and attached to the wheel 1 by means of screws or bolts 12 and this cutter revolves counterclockwise with the power wheel and spindle as the wheel advances over the ground.

The rotary cutter 11, which revolves clockwise, is loosely mounted on the spindle, and it is provided at its outer side with an internal gear ring 13 that is fastened thereto by screws or bolts 14.

For transmitting power from the rotating spindle to the gear ring 13 and the cutter 11, a drive pinion 15 is keyed on spindle 3 to revolve therewith, and this drive pinion meshes with an idler pinion 16 journaled on the stud bolt 8, and meshes with the internal gear ring 13.

As thus illustrated and described, the implement through the use of the oppositely revolving cutters, provides a shearing action on the grass of the lawn that trims and cuts cleanly and neatly, and the implement may with comparative ease be trundled by hand for the smooth performance of its functions.

Having thus fully described my invention, what I claim as new and desire to secure by Letters Patent is:

In a lawn edge trimmer having a handle, a yoke carried by the handle, a spindle journalled in the yoke and a non-rotary housing on the spindle, the improvement comprising a power wheel rotatable with the spindle, a cutter rigid with the wheel, a cutter loose on the spindle and both cutters being located outwardly of the non-rotary housing, a drive pinion fixed to the spindle within the housing, a stud bolt carried by the yoke parallel with the spindle and extending into the housing, an idler pinion on the stud bolt within the housing in mesh with the drive pinion on the spindle, an internal ring gear on the cutter loose on the spindle in mesh with the idler pinion so that upon forward motion of the power wheel the cutters will revolve in opposite directions.

HYMAN ABRONS.

REFERENCES CITED

The following references are of record in the file of this patent:

UNITED STATES PATENTS

| Number | Name | Date |
|---|---|---|
| 1,472,587 | Crowder | Oct. 30, 1923 |

FOREIGN PATENTS

| Number | Country | Date |
|---|---|---|
| 15,058 | Australia | 1928 |
| 15,379 | Great Britain | 1908 |